United States Patent [19]

Hosoi

[11] Patent Number: 5,500,982
[45] Date of Patent: Mar. 26, 1996

[54] HINGE MECHANISM FOR PORTABLE ELECTRONIC APPARATUS

[75] Inventor: Takashi Hosoi, Oume, Japan

[73] Assignee: Kabushiki Kaisha Toshiba, Kawasaki, Japan

[21] Appl. No.: 358,573

[22] Filed: Dec. 13, 1994

Related U.S. Application Data

[63] Continuation of Ser. No. 83,327, Jun. 29, 1993, abandoned, which is a continuation of Ser. No. 766,270, Sep. 27, 1991, abandoned, which is a division of Ser. No. 633,197, Dec. 31, 1990, Pat. No. 5,052,078, which is a continuation of Ser. No. 542,784, Jun. 26, 1990, abandoned, which is a continuation of Ser. No. 90,279, Aug. 28, 1987, abandoned.

[30] Foreign Application Priority Data

Aug. 29, 1986 [JP] Japan .................................. 61-131357

[51] Int. Cl.⁶ .................................................. E05D 11/10
[52] U.S. Cl. .............................. 16/297; 16/308; 16/342
[58] Field of Search .......................... 16/282, 285, 287, 16/297, 302, 319, 337, 341, 342, 366, 368, 293–295, 298, 307, 308, 321, 323, 386; 248/284, 917, 923, 133, 454, 462; 312/208, 325, 327; 361/380, 394, 395; 235/145 R; 364/708; 340/705, 711, 712; 358/224; 400/83–85, 680, 713, 714; D14/106; D18/6, 7

[56] References Cited

U.S. PATENT DOCUMENTS

| | | | |
|---|---|---|---|
| 845,863 | 3/1907 | Erickson | 16/287 |
| 1,166,551 | 1/1916 | Simmons | 16/342 |
| 4,355,914 | 10/1982 | Alexander | 400/713 |
| 4,438,458 | 3/1984 | Münscher | 248/917 |
| 4,496,943 | 1/1985 | Greenblatt | 340/711 |
| 4,589,659 | 5/1986 | Yokoi et al. | 364/708 |
| 4,617,699 | 10/1986 | Nakamura | 16/342 |
| 4,684,017 | 8/1987 | Watanabe et al. | 16/366 |
| 4,730,364 | 3/1988 | Tat-Kee | 16/337 |
| 4,734,955 | 4/1988 | Connor | 16/342 |
| 4,744,127 | 5/1988 | Shadley | 16/287 |
| 4,781,422 | 11/1988 | Kimble | 16/337 |
| 4,825,395 | 4/1989 | Kinser et al. | 364/708 |
| 4,846,536 | 7/1989 | Saitou et al. | 312/72 |
| 4,961,126 | 10/1990 | Suzuki | 248/919 |

FOREIGN PATENT DOCUMENTS

| | | | |
|---|---|---|---|
| 1093165 | 5/1955 | France | 16/342 |
| 1140351 | 7/1957 | France | 16/366 |
| 3023637 | 1/1981 | Germany | 16/337 |
| 42077 | 10/1985 | Germany | 16/366 |
| 60-225919 | 11/1985 | Japan | 16/342 |
| 61-7971 | 1/1986 | Japan | 364/708 |

OTHER PUBLICATIONS

U.K. Patent Application No. 2,140,073A, pub. Nov. 11, 1984; Inventor: Lindahl et al. classified in 16/321.
I.B.M. Technical Disclosure Bulletin, vol. #28, No. 6 Nov. 1985, pp. 2476 & 2477.

*Primary Examiner*—Lowell A. Larson
*Assistant Examiner*—Donald M. Gurley
*Attorney, Agent, or Firm*—Foley & Lardner

[57] ABSTRACT

A portable electronic apparatus of the present invention has a body portion with a keyboard on a front upper part thereof, and a display portion which is connected to a higher position at the rear of the body portion through a hinge portion such that the display portion is folded down and pulled up with respect to the body portion. The display portion is provided with a large-sized display screen such as a liquid crystal display (LCD) on a front surface thereof. The hinge portion comprises a hinge member which is disposed in a recess formed on the body portion and divided into a hinge cover and a hinge base; a pair of hinge shafts projecting from both upper ends of the hinge member and whose projecting ends are connected to the bottom of the display portion; presser spring disposed in the hinge member, each engaging with the corresponding hinge shaft to restrict the pivotal movement of the hinge shaft; torsion bars disposed on both lower sides of the hinge member; and supporting portions provided on side faces of the body portion and to which the torsion bars are fitted. Each of the hinge shafts has an elliptic section at least at a portion engaging with the presser spring so that a deflection quantity of the presser spring is automatically adjusted.

26 Claims, 5 Drawing Sheets

HINGE MECHANISM FOR PORTABLE ELECTRONIC APPARATUS

This application is a continuation of application Ser. No. 08/083,327, filed Jun. 29, 1993, now abandoned, which is a continuation of Ser. No. 07/766,270 filed on Sep. 27, 1991, now abandoned, which is a divisional of application Ser. No. 07/633,197, filed Dec. 31, 1990, (now U.S. Pat. No. 5,052, 078), which is a continuation of Ser. No. 07/542,784, filed on Jun. 26, 1990, now abandoned, which is a continuation of Ser. No. 07/090,279, filed on Aug. 28, 1987, now abandoned.

BACKGROUND OF THE INVENTION

1. Field of the Invention

The present invention relates to a portable electronic apparatus having a body portion and a display portion which is connected to the body portion through a hinge mechanism such that the display portion is folded down and pulled up with respect to the body portion, and particularly to a hinge mechanism which enables the angle of the display portion to be adjusted with constant force.

2. Description of the Prior Art

In a portable personal computer or a portable word processor, a thin display portion provided with a large-sized display screen, such as a liquid crystal display (LCD), is connected to a body portion such that the display is folded over a keyboard of the body portion and pulled up therefrom. To carry the apparatus, the display portion is folded down to provided an attache-case-like appearance, and, to use the same, the display portion is pulled up and positioned behind the keyboard.

Figure 1:
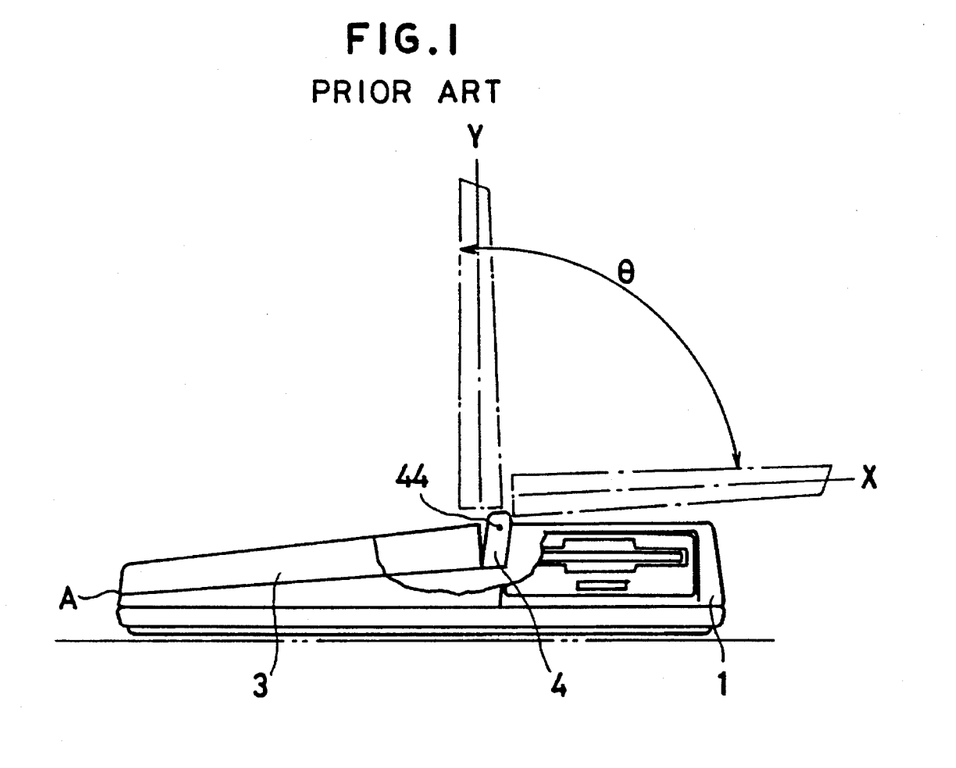
FIG. 1 is a side view showing a conventional portable electronic apparatus with a display portion at an open position and at a closed position.
Figure 2:
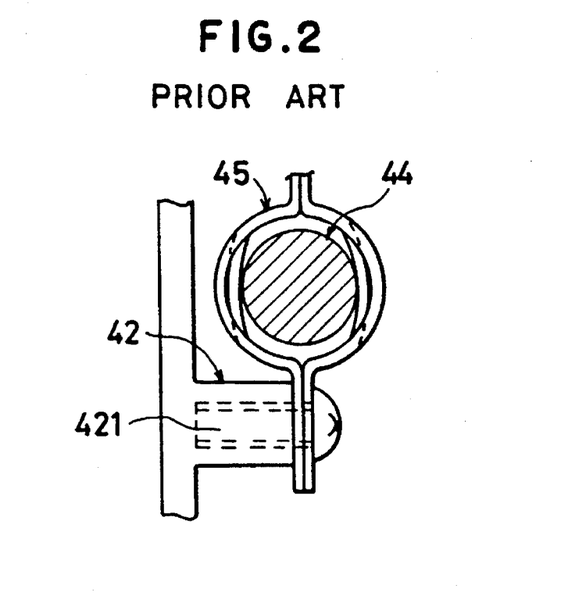
FIG. 2 is an enlarged section showing a hinge shaft portion of the conventional portable electronic apparatus shown in FIG. 1.

A typical example of a conventional portable electronic apparatus is shown in FIGS. 1 and 2. FIG. 1 is a side view showing an open position and a closed position of the conventional portable electronic apparatus, and FIG. 2 is an enlarged side view showing the hinge shaft of the apparatus in FIG. 1.

As shown in FIG. 1, the conventional portable electronic apparatus has a body portion 1 to which a display portion 3 is connected through a hinge portion 4 such that the display portion 3 is folded down and pulled up with respect to the body portion 1. The display portion 3 is journaled to the body portion 1 through a hinge shaft 44 of the hinge portion 4.

As shown in FIG. 1, when the apparatus is not used, the display portion 3 is positioned at "A" to cover a keyboard 2 of the body portion 1, so that the apparatus may provide a compact appearance, easily be stored and carried, and protect the display portion 3 as well as the keyboard 2.

To use the apparatus, an angle of the display portion 3 is properly adjusted through the hinge shaft 44.

It is required that the angle of the display portion 3 is continuously adjusted within the range of angle θ from Y to X shown in FIG. 1 to keep the display portion 3 at a selected angle. To achieve such an adjustment, the hinge shaft 44 is pressed, as shown in FIG. 2, by a presser spring 45 with constant force, so that frictional force between the hinge shaft 44 and the presser spring 45 may keep the display portion 3 at the selected angle.

However, according to the conventional portable electronic apparatus with the above-mentioned arrangement, the angle of the display portion 3 is adjusted by utilizing the frictional force which is always constant, between the hinge shaft 44 and the presser spring 45. Therefore, a moment derived from the product of the weight and the position of gravity center of the display portion 3 changes as the angle θ varies. Due to this, force to be applied to the display portion 3 to change the angle thereof shall be increased or decreased.

Namely, the moment will be maximized when the display portion 3 takes a horizontal position X, and will be zero when the display portion 3 takes an upright angle Y. Therefore, in adjusting the angle of the display portion 3, an operator shall apply stronger force as the display portion 3 approaches the position Y, and weaker force as the display portion 3 approaches the position X. In this way, the operator is subjected to bothersome work to, reduce or increase his force to be applied to the display portion 3, and, therefore, the commercial value in terms of operability of the apparatus may be reduced.

Further, with the above-mentioned arrangement, the presser spring 45 shall always tighten the hinge shaft 44 with force which is larger than the maximum moment so that its reaction may be applied to a plastic boss 421 of a hinge base 42, to cause the creep and deteriorate durability and reliability of the hinge portion 4.

SUMMARY OF THE INVENTION

The present invention is to solve the problems inherent to the conventional portable electronic apparatus mentioned above.

An object of the present invention is to provide a hinge mechanism for a portable electronic apparatus, which has excellent operability in adjusting the angle of a display portion of the apparatus.

Another object of the present invention is to provide a hinge mechanism for a portable electronic apparatus, which enables the angle of a display portion of the apparatus to be adjusted to optional angles with constant force.

The other object of the present invention is to provide a hinge mechanism for a portable electronic apparatus, which has an excellent durability and reliability.

A feature of the present invention resides in a portable electronic apparatus having a body portion and a display portion connected to the body portion through a hinge portion such that the display portion is folded down and pulled up with respect to the body portion. The hinge portion comprises a hinge member whose upper part supports a lower end of the display portion, a pair of hinge shafts each having an elliptic cross section, presser spring engaged with the hinge shafts to control the pivotal movement thereof, torsion bars pivotably inserted into both lower sides of the hinge member, and supporting portions to which the torsion bars are engaged. When the display portion is brought to an upright position, a minor diametral portion of the hinge shaft contacts the presser spring, and, when the display portion is brought to a horizontal position, a major diametral portion of the hinge shaft contacts the presser spring.

Each of the hinge shafts of the portable electronic apparatus according to the present invention has an elliptic cross section at least at a portion contacting the corresponding presser spring. When the display portion is brought to the horizontal position at which the maximum moment is applied to the hinge shaft, the major diametral portion of the hinge shaft contacts the presser spring to increase a deflection quantity of the presser spring. When the display portion is brought to the upright position at which the minimum moment is applied to the hinge shaft, the minor diametral portion of the hinge shaft contacts the presser spring to decrease the deflection quantity of the presser spring. With such an arrangement, an angle of the display portion is adjusted by an operator with constant force to be applied to the display portion, and force to be applied to a boss portion of a hinge base will be constant to prevent a creep from being caused at the hinge portion.

These and other objects, features and advantages of the present invention will become apparent from the following description of a preferred embodiment taken in conjunction with the accompanying drawings.

DESCRIPTION OF THE PREFERRED EMBODIMENTS

Figure 3:
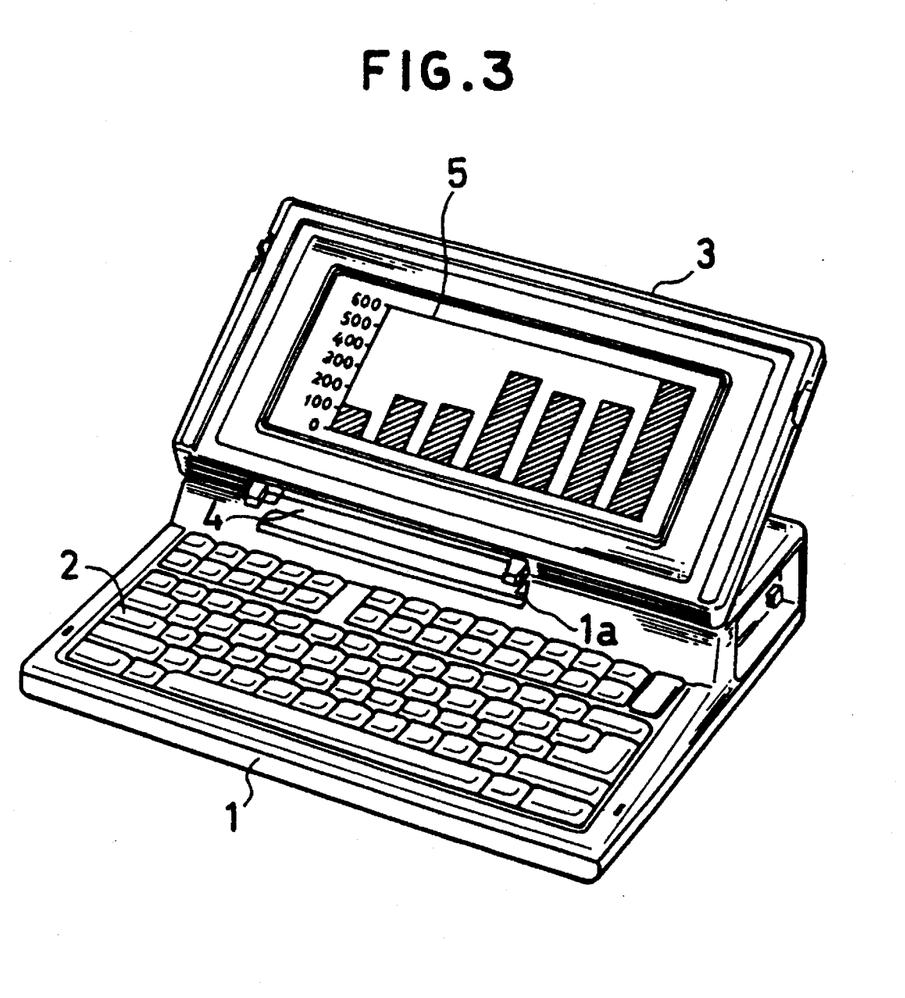
FIG. 3 is a perspective view showing an assembled portable electronic apparatus according to the present invention.
Figure 5:
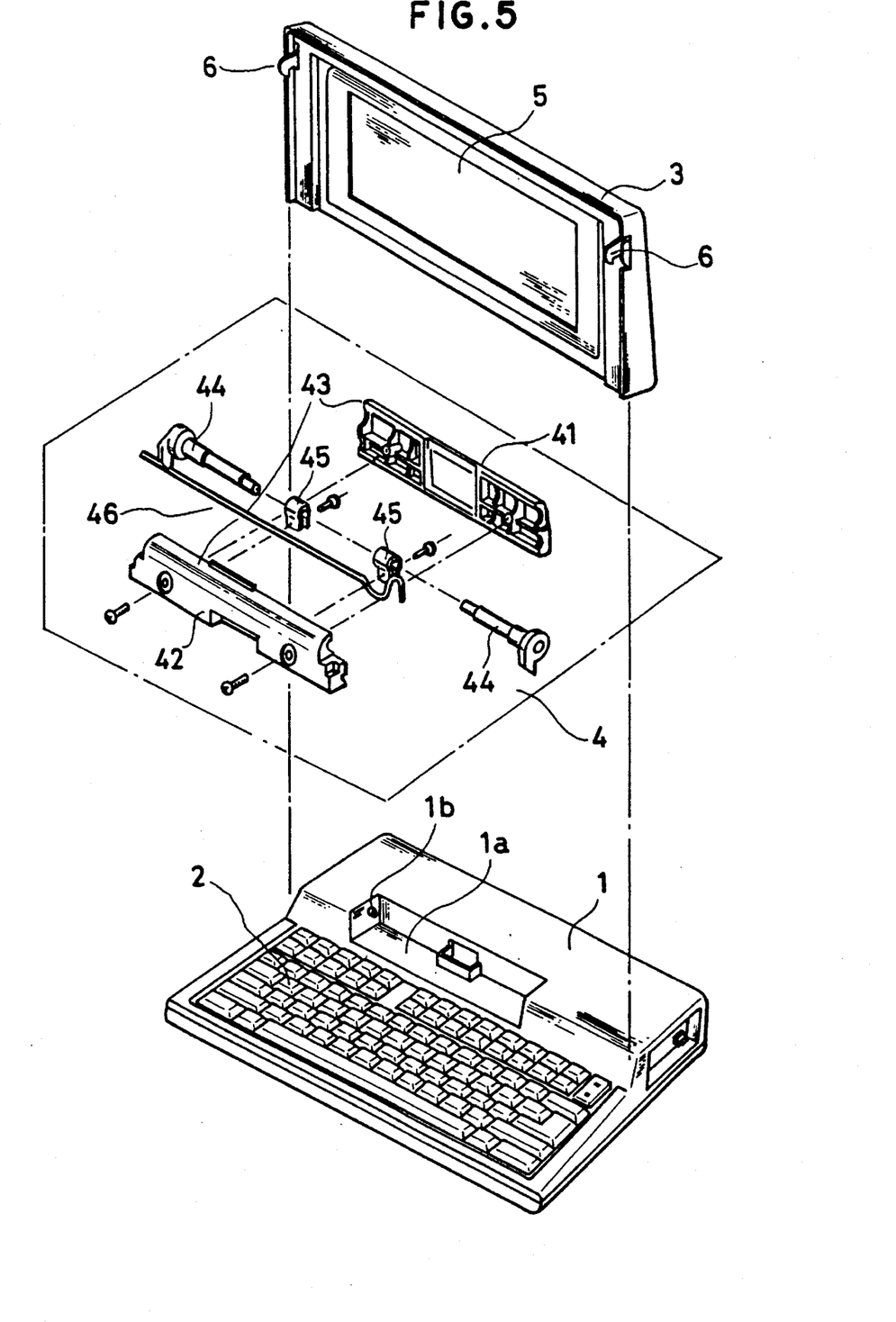
FIG. 5 is an exploded perspective view showing the electronic apparatus shown in FIG. 3.

FIG. 3 is a perspective view showing an assembled portable electronic apparatus according to the present invention, and FIG. 5 an exploded perspective view showing the apparatus in FIG. 3.

The portable electronic apparatus according to the present invention has a body portion 1 with a keyboard 2 which is disposed on a front upper portion of the body portion 1, and a display portion 3 which is connected to a higher position at the rear of the body portion 1 through a hinge portion 47, such that the display portion 3 is folded down and pulled up with respect to the body portion 1. The display portion 3 is provided with a large-sized display screen 5 such as a liquid crystal display (LCD) on a front surface of the display portion 3.

The hinge portion 47 comprises a hinge member 43 disposed in a recess 1a formed on the body portion 1 and divided into a hinge cover 41 and a hinge base 42; a pair of hinge shafts 44 projecting from both upper ends of the hinge member 43 and whose projecting ends are connected to a bottom surface of the display portion 3; presser spring 45 disposed in the hinge member 43 and engaged with corresponding hinge shafts 44 to frictionally retard the pivotal movement of the shafts 44; torsion bars 46 (only one is shown in the figures) disposed on both lower sides of the hinge member 43; and supporting portions 1b provided on side faces of the body portion 1 and to which the torsion bars 46 are fitted respectively.

Each of the hinge shafts 44 has an elliptic section at least at a portion engaging with the corresponding presser spring 45, so that a deflection quantity of the presser spring 45 is automatically adjusted.

With reference to FIGS. 4 to 7, an opening and closing mechanism of the display portion 3 of the portable electronic apparatus according to the present invention will be described.

Figure 4:
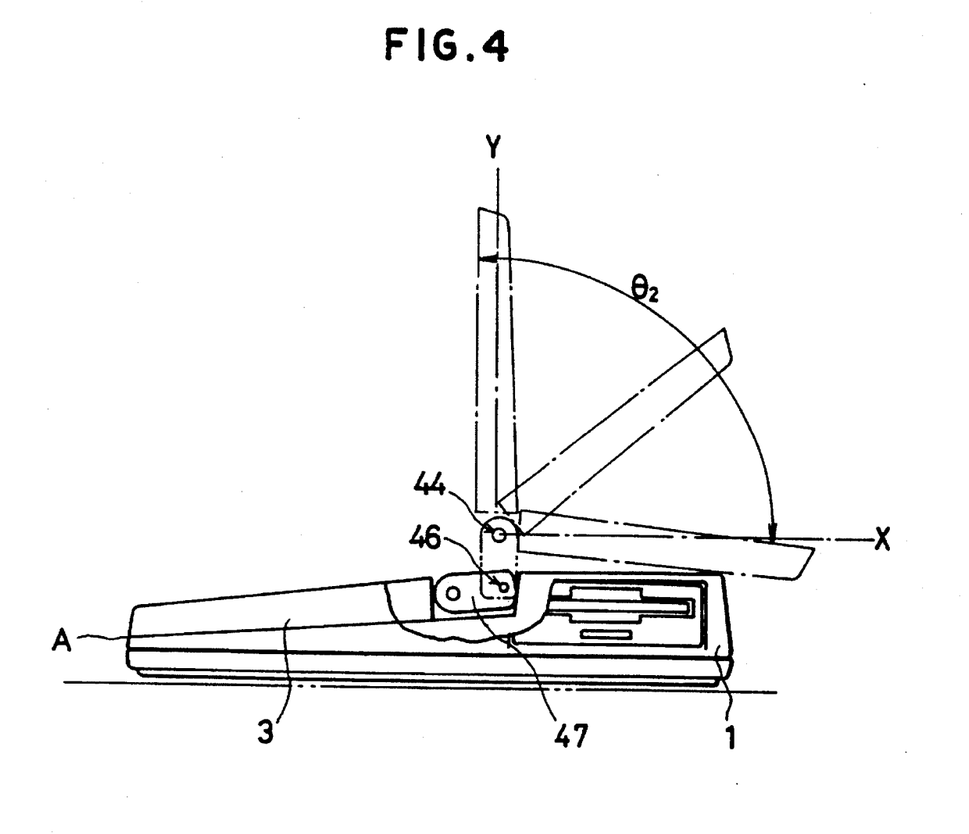
FIG. 4 is a side view showing the electronic apparatus shown in FIG. 3.

When the portable electronic apparatus is not used, the display portion 3 is positioned at "A" shown in FIG. 4 to cover the keyboard 2 of the body portion 1.

To use the apparatus, the display portion 3 together with the hinge portion 47 are pivoted around the torsion bars 46 to bring the apparatus to an upright position Y shown in FIG. 4. When the display portion 3 reaches the point Y, the torsion bars 46 are fixed and locked by the action of supporting brackets, etc.

After that, the display portion 3 is pivoted around the hinge shafts 44 to adjust an angle $\theta_2$ to an optional value within a range from the point Y (upright) to the point X (horizontal) shown in FIG. 4. At this time, the frictional force between each of the hinge shafts 44 and the corresponding spring 45 is required to be larger than the maximum moment applied to the hinge shaft 44. This requirement is attained by increasing a deflection quantity of the spring 45 to increase force to tighten the corresponding hinge shaft 44.

Thus, the presser spring 45 serves as a friction member, due to its contact with the elliptical portion of hinge shaft 44. When the display screen is in its upright or erect position, the frictional force between the presser spring 45 and the hinge shaft 44 is at its minimum. As the display screen is rotated toward the second position, the elliptical configuration of the hinge shaft produces its maximum frictional force. This maximum frictional force results from engagement of the major elliptical axis of the elliptical configuration with the presser spring 45.

Figure 6:
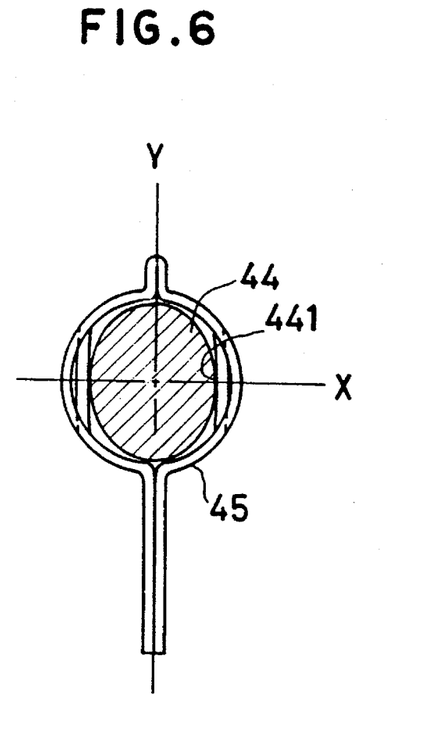
FIGS. 6 and 7 are enlarged sections showing a hinge shaft portion of the electronic apparatus shown in FIG. 3.
Figure 7:
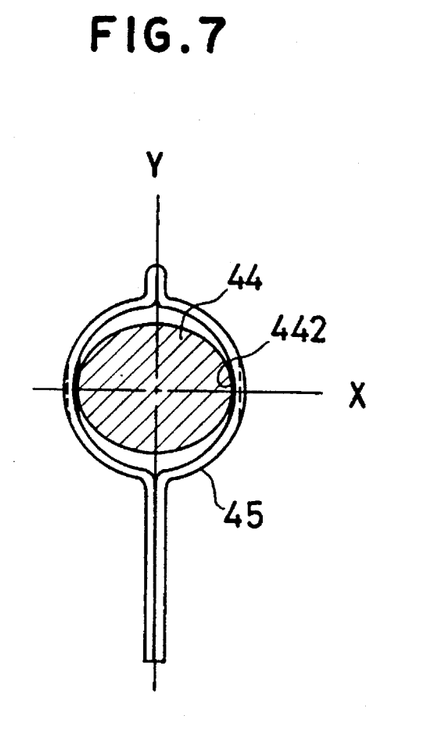

As shown in FIGS. 6 and 7, each of the hinge shafts 44 according to the present invention has an elliptic section over at least a portion engaging the corresponding presser spring 45. Therefore, when the display portion 3 is at the point Y at which a moment is zeroed, the presser spring 45 contacts a minor diametral portion 441 of the corresponding hinge shaft 44 (FIG. 6), and, when the display portion 3 is at the point X at which the moment is maximized, the presser spring 45 contacts a major diametral portion 442 of the hinge shaft 44 (FIG. 7).

Therefore, when the moment is zeroed (upright), a deflection quantity of the presser spring 45 is small, to minimize the frictional force between the hinge shaft 44 and the presser spring 45. When the moment is maximized (horizontal), the deflection quantity of the presser spring 45 is large to maximize the frictional force between the hinge shaft 44 and the presser spring 45. Accordingly, an operator can adjust the display portion 3 to an optional angle by applying a constant force.

For the display portion 3 of the present invention, not only the liquid crystal display but also a flat display such as a plasma display and an electroluminescence (EL) display may be used.

Further, the opening and closing mechanism for the display portion 3 according to the present invention is applicable also for a sheet suppressing door of a copy machine, etc.

As described in the above, in a portable electronic apparatus according to the present invention, a hinge shaft of a hinge portion has an elliptic section at least at a portion contacting a presser spring so that, when a display portion is brought to an upright position at which a moment is zeroed, a minor diametral portion of the hinge shaft contacts the presser spring to reduce a deflection quantity of the presser spring, and, when the display portion is brought to a horizontal position at which the moment is maximized, a major diametral portion of the hinge shaft contacts the presser spring to increase the deflection quantity of the presser spring. In this way, the deflection quantity of the presser spring can automatically be adjusted.

Therefore, an angle of the display portion can be adjusted by an operator with constant force so that an excellent operability may be realized.

Further, in the portable electronic apparatus of the present invention, force to be applied to a boss portion of a hinge base is constant and weaker than that applied to a conventional apparatus, so that creep, etc., may not be caused on the hinge portion, and durability and reliability thereof may be improved.

Various modifications will become possible for those skilled in the art after reviewing the teachings of the present disclosure without departing from the scope thereof.

What is claimed is:

1. A portable electronic apparatus comprising:
   a base unit including a keyboard and a hinge mount portion;
   a hinge device mounted on the hinge mount portion;
   a display unit rotatably connected to the base unit through the hinge device, and including an outer surface and an inner surface having a display screen, the display unit being rotatable between a first position for covering the keyboard, a second position for exposing the display screen in an upward direction for viewing from above, and an erect position between the first position and the second position;
   the hinge device including:
   (1) a rotatable shaft connected to the display unit; and
   (2) a friction member contacting the rotatable shaft for generating an increasing friction force corresponding to the angle of rotation of the display unit as the display unit rotates from the erect position to the second position, the friction force temporarily keeping the display unit in a selected position between the erect position and the second position;
   wherein the rotatable shaft has a cross section, said cross section having a first diameter larger than a second diameter; and
   wherein the friction member is in contact with a portion on the second diameter of the rotatable shaft when the display unit is in the erect position.

2. A portable electronic apparatus as claimed in claim 1, wherein the friction member is in contact with a portion on the first diameter of the rotatable shaft when the display unit is in the second position so that the friction force is maximized when the display unit is in the second position.

3. A portable electronic apparatus as claimed in claim 1, wherein the erect position of the display unit is a position in which the display screen is exposed for viewing in a horizontal direction.

4. A portable electronic apparatus as claimed in claim 1, wherein the rotatable shaft has an oval cross section, the friction member being a presser spring that engages the rotatable shaft, the rotatable shaft having a major diametrical portion and a minor diametrical portion, the minor diametrical portion of the rotatable shaft contacting the presser spring when the display unit is in the erect position and the major diametrical portion of the rotatable shaft contacting the presser spring when the display unit rotates between the erect position and the second position.

5. A portable electronic apparatus as claimed in claim 4, wherein the hinge device further includes (3) a hinge member connecting the display unit with the base unit, the hinge member including an upper portion receiving the rotatable shaft for rotatably connecting the display unit to the hinge member and a lower portion having a pivot for rotatably connecting the base unit to the hinge member, the display unit being rotatable between the first position and the erect position by the pivot.

6. A portable electronic apparatus comprising:
   a base unit including a keyboard and a hinge mount portion;
   a hinge device mounted on the hinge mount portion; and
   a display unit rotatably connected to the base unit through the hinge device, and including an outer surface and an inner surface having a display screen, the display unit being rotatable between a first position for covering the keyboard, a second position for exposing the display screen in an upward direction, and an erect position between the first position and the second position;
   the hinge device including:
   (1) a rotatable shaft connected to the display unit; and
   (2) a friction member engaged with the rotatable shaft, the friction member generating a friction force for temporarily keeping the display unit in a predetermined position between the erect position and the second position;
   wherein the rotatable shaft has a cross section, said cross section having a first diameter larger than a second diameter; and
   wherein the friction member is in contact with a portion on the second diameter of the rotatable shaft when the display unit is in the erect position.

7. A portable electronic apparatus as claimed in claim 6, wherein the erect position of the display unit is a position in which the display screen is exposed for viewing in a horizontal direction.

8. A portable electronic apparatus as claimed in claim 6, wherein the friction member is a presser spring that engages the rotatable shaft and wherein the rotatable shaft has a major diametrical portion and a minor diametrical portion, the minor diametrical portion of the rotatable shaft contacting the presser spring when the display unit is in the erect position, the major diametrical portion of the rotatable shaft contacting the presser spring when the display unit rotates between the erect position and the second position.

9. A portable electronic apparatus as claimed in claim 8, wherein the hinge device further includes (3) a hinge member connecting the display unit with the base unit, the hinge member including an upper portion receiving the rotatable shaft for rotatably connecting the display unit to the hinge member and a lower portion having a pivot for rotatably connecting the base unit to the hinge member, the display unit being rotatable between the first position and the erect position by the pivot.

10. A portable electronic apparatus comprising:
    a base unit including a front portion having a keyboard;
    a rotatable shaft;
    a display unit rotatably connected to the base unit by at least the rotatable shaft, and including an outer surface and an inner surface having a display screen, the display unit being rotatable between a first position for covering the keyboard, a second position for exposing the display screen in an upward direction, and a predetermined position between the first position and the second position; and a friction member for generating a friction force sufficient to temporarily keep the display unit in an arbitrary position between the predetermined position and the second position, and for refraining from generating the friction force between the first position and the predetermined position;

wherein the rotatable shaft has a cross section, said cross section having a first diameter larger than a second diameter; and wherein the friction member is in contact with a portion on the second diameter of the rotatable shaft when the display unit is in the predetermined position.

11. A portable electronic apparatus as claimed in claim 10, wherein the predetermined position of the display unit is a position in which the display screen is exposed for viewing in a horizontal direction.

12. A portable electronic apparatus as claimed in claim 10, wherein the rotatable shaft has an oval cross section, and wherein the friction member includes a presser spring that engages the rotatable shaft, the rotatable shaft having a major diametrical portion and a minor diametrical portion, the minor diametrical portion of the rotatable shaft contacting the presser spring when the display unit is in the predetermined position, the major diametrical portion of the rotatable shaft contacting the presser spring when the display unit rotates between the predetermined position and the second position.

13. A portable electronic apparatus as claimed in claim 12, further comprising a hinge member connecting the display unit with the base unit, the hinge member including an upper portion receiving the rotatable shaft for rotatably connecting the display unit to the hinge member and a lower portion having a pivot for rotatably connecting the base unit to the hinge member, the display unit being rotatable between the first position and the predetermined position by the pivot.

14. A portable electronic apparatus comprising:

a base unit including a keyboard and a hinge mount portion;

a hinge device mounted on the hinge mount portion; and a display unit rotatably connected to the base unit through the hinge device and including an outer surface and an inner surface having a display screen, the display unit being rotatable between a first position for covering the keyboard, a second position for exposing the display screen in an upward direction, and an erect position between the first position and the second position;

the hinge device including:

a rotatable shaft connecting the display unit and the base unit; and a friction member engaged with the rotatable shaft, the friction member generating an increasing friction force for temporarily keeping the display unit in an arbitrary position between the erect position and the second position as the display unit rotates in the direction of the second position;

wherein the rotatable shaft has a cross section, said cross section having a first diameter larger than a second diameter; and wherein the friction member is in contact with a portion on the second diameter of the rotatable shaft when the display unit is in the erect position.

15. A portable electronic apparatus as claimed in claim 14, wherein the friction member is in contact with a portion on the first diameter of the rotatable shaft when the display unit is in the second position so that the friction force is maximized when the display unit is in the second position.

16. A portable electronic apparatus as claimed in claim 14, wherein the erect position of the display unit is a position in which the display screen is exposed for viewing in a horizontal direction.

17. A portable electronic apparatus as claimed in claim 14, wherein the friction member is a presser spring that engages the rotatable shaft, the rotatable shaft having a major diametrical portion and a minor diametrical portion, the minor diametrical portion of the rotatable shaft contacting the presser spring when the display unit is in the erect position, the major diametrical portion of the rotatable shaft contacting the presser spring when the display unit rotates between the erect position and the second position.

18. A portable electronic apparatus as claimed in claim 17, wherein the hinge device further includes a hinge member connecting the display unit with the base unit, the hinge member including an upper portion receiving the rotatable shaft for rotatably connecting the display unit to the hinge member and a lower portion having a pivot for rotatably connecting the base unit to the hinge member, the display unit being rotatable between the first position and the erect position by the pivot.

19. A portable electronic apparatus comprising:

a first unit including a first electronic component and a hinge mount portion;

a hinge device mounted on the hinge mount portion;

a second unit including a second electronic component in the second unit, the second unit rotatably connected to the first unit through the hinge device, the second unit being rotatable between a first position for closing the first unit and the second unit, a second position for fully opening the first unit and the second unit, and an erect position for raising the second unit relative to the first unit;

the hinge device including:

a rotatable shaft connected to the second unit; and a friction member engaging the rotatable shaft, the friction member increasingly generating a friction force for temporarily keeping the second unit in a selected position between the erect position and the second position as the second unit rotates in the direction of the second position;

wherein the rotatable shaft has a cross section, said cross section having a first diameter larger than a second diameter; and wherein the friction member is in contact with a portion on the second diameter of the rotatable shaft when the display unit is in the erect position.

20. A portable electronic apparatus as claimed in claim 19, wherein the first unit is a base unit having a keyboard.

21. A portable electronic apparatus as claimed in claim 19, wherein the second unit is a display unit having a display screen.

22. A portable electronic apparatus comprising:

a base body including a first electronic component and a hinge mount portion;

a hinge device mounted on the hinge mount portion;

a display unit including a second electronic component in the display unit, the display unit rotatably connected to the base body through the hinge device, the display unit being rotatable between a first position for closing the base body and the display, a second position for fully opening the base body and the display unit, and an erect position for raising the second unit relative to the base body;

the hinge device including:

a rotatable shaft connected to the display unit; and a friction member engaging the rotatable shaft, the friction member increasingly generating a friction force for temporarily keeping the display unit in a selected position between the erect position and the second position as the display unit rotates in the direction of the second position;

wherein the rotatable shaft has a cross section, said cross section having a first diameter larger than a second diameter; and wherein the friction member is in contact with a portion on the second diameter of the rotatable shaft when the display unit is in the erect position.

23. A portable electronic apparatus comprising:

a base unit including a keyboard and a hinge mount portion;

a hinge device mounted on the hinge mount portion;

a display unit rotatably connected to the base unit through the hinge device, and including an outer surface and an inner surface having a display screen, the display unit being rotatable between a first position for covering the keyboard, a second position for exposing the display screen in an upward direction for viewing from above, and an erect position between the first position and the second position;

the hinge device including:
(1) a rotatable shaft connected to the display unit; and
(2) a friction member contacting the rotatable shaft for generating an increasing friction force corresponding to the angle of rotation of the display unit as the display unit rotates from the erect position to the second position, the friction force temporarily keeping the display unit in a selected position between the erect position and the second position;

wherein the rotatable shaft has an oval cross section, said cross section having a first diameter larger than a second diameter, the rotatable shaft having a major diametrical portion and a minor diametrical portion; and wherein the friction member includes a presser spring that engages the rotatable shaft, the minor diametrical portion of the rotatable shaft contacting the presser spring when the display unit is in the erect position and the major diametrical portion of the rotatable shaft contacting the presser spring when the display unit rotates between the erect position and the second position.

24. A portable electronic apparatus comprising:

a base unit including a keyboard and a hinge mount portion;

a hinge device mounted on the hinge mount portion; and a display unit rotatably connected to the base unit through the hinge device, and including an outer surface and an inner surface having a display screen, the display unit being rotatable between a first position for covering the keyboard, a second position for exposing the display screen in an upward direction, and an erect position between the first position and the second position;

the hinge device including:
(1) a rotatable shaft connected to the display unit; and
(2) a friction member engaged with the rotatable shaft, the friction member generating a friction force for temporarily keeping the display unit in a predetermined position between the erect position and the second position;

wherein the rotatable shaft has a cross section, said cross section having a first diameter larger than a second diameter;

wherein the friction member includes a presser spring that engages the rotatable shaft; and wherein the rotatable shaft has a major diametrical portion and a minor diametrical portion, the minor diametrical portion of the rotatable shaft contacting the presser spring when the display unit is in the erect position, the major diametrical portion of the rotatable shaft contacting the presser spring when the display unit rotates between the erect position and the second position.

25. A portable electronic apparatus comprising:

a base unit including a front portion having a keyboard;

a rotatable shaft;

a display unit rotatably connected to the base unit by at least the rotatable shaft, and including an outer surface and an inner surface having a display screen, the display unit being rotatable between a first position for covering the keyboard, a second position for exposing the display screen in an upward direction, and a predetermined position between the first position and the second position; and a friction member for generating a friction force sufficient to temporarily keep the display unit in an arbitrary position between the predetermined position and the second position, and for refraining from generating the friction force between the first position and the predetermined position;

wherein the rotatable shaft has an oval cross section, said cross section having a first diameter larger than a second diameter; and wherein the friction member includes a presser spring that engages the rotatable shaft, the rotatable shaft having a major diametrical portion and a minor diametrical portion, the minor diametrical portion of the rotatable shaft contacting the presser spring when the display unit is in the predetermined position, the major diametrical portion of the rotatable shaft contacting the presser spring when the display unit rotates between the predetermined position and the second position.

26. A portable electronic apparatus comprising:

a base unit including a keyboard and a hinge mount portion;

a hinge device mounted on the hinge mount portion; and a display unit rotatably connected to the base unit through the hinge device and including an outer surface and an inner surface having a display screen, the display unit being rotatable between a first position for covering the keyboard, a second position for exposing the display screen in an upward direction, and an erect position between the first position and the second position;

the hinge device including:

a rotatable shaft connecting the display unit and the base unit; and a friction member engaged with the rotatable shaft, the friction member generating an increasing friction force for temporarily keeping the display unit in an arbitrary position between the erect position and the second position as the display unit rotates in the direction of the second position;

wherein the rotatable shaft has a cross section, said cross section having a first diameter larger than a second diameter; and wherein the friction member includes a presser spring that engages the rotatable shaft, the rotatable shaft having a major diametrical portion and a minor diametrical portion, the minor diametrical portion of the rotatable shaft contacting the presser spring when the display unit is in the erect position, the major diametrical portion of the rotatable shaft contacting the presser spring when the display unit rotates between the erect position and the second position.

* * * * *